Aug. 25, 1925.
F. W. OFELDT
1,551,209
VALVE MECHANISM
Filed March 11, 1924   2 Sheets-Sheet 1
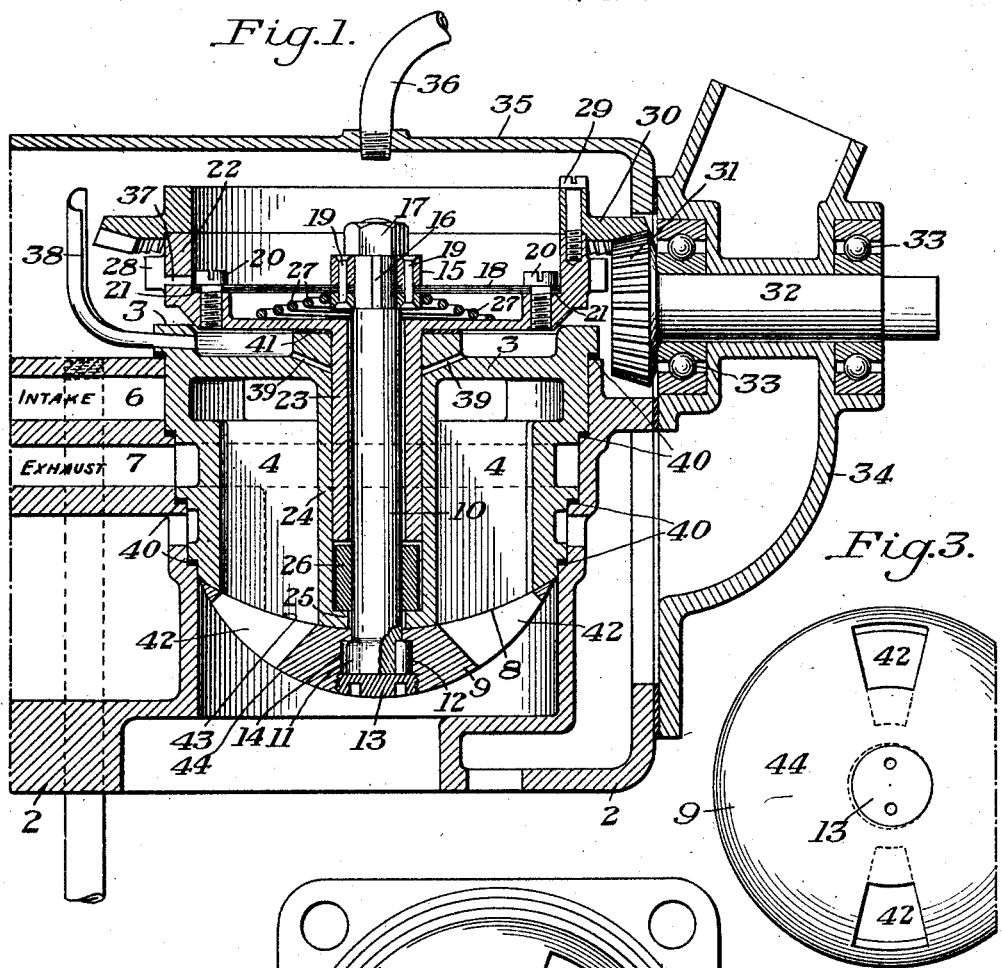
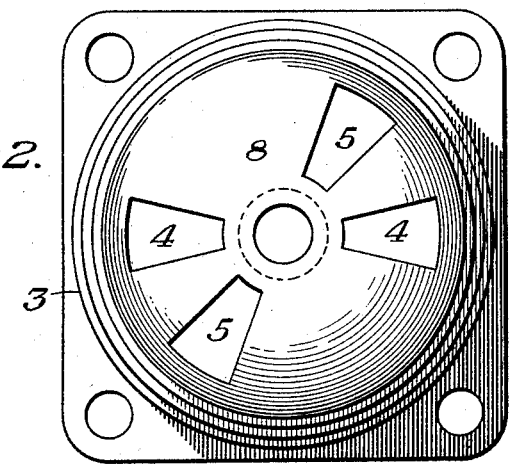
INVENTOR
Frank W. Ofeldt
By Byrnes, Stebbins & Parmelee
his Attys

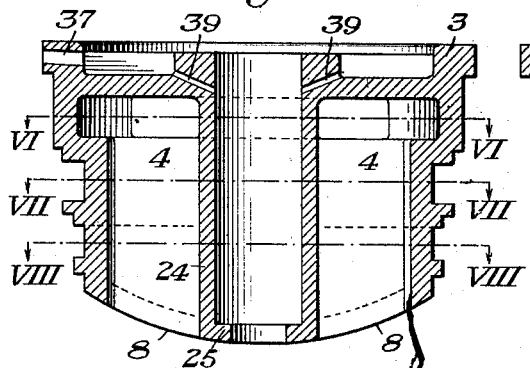
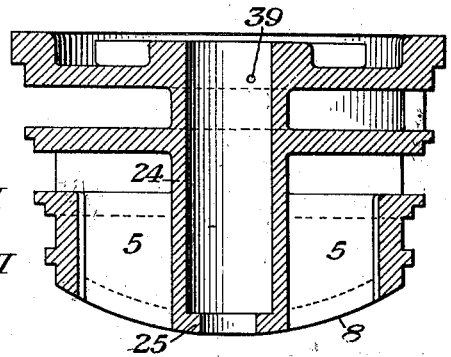
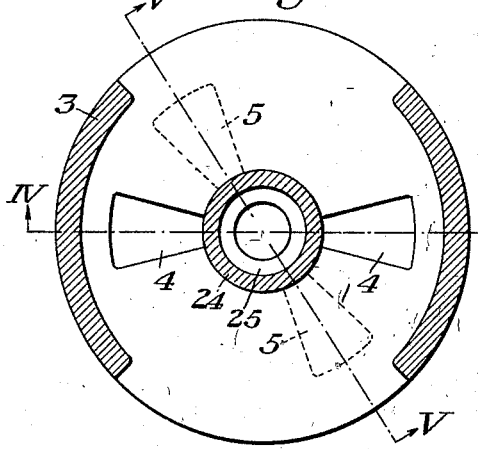
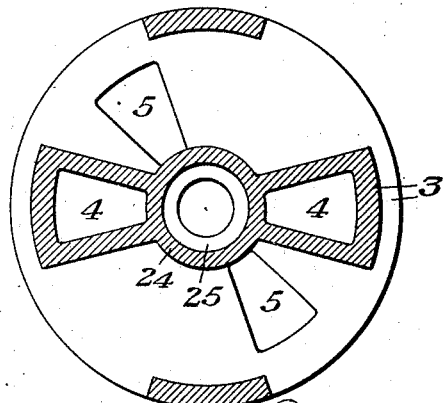
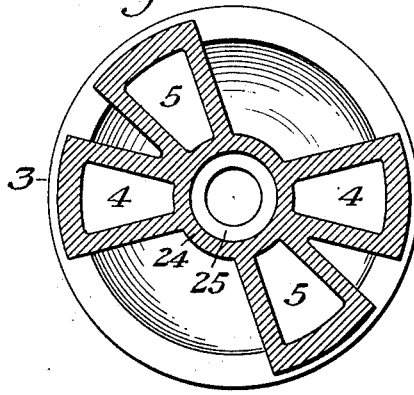
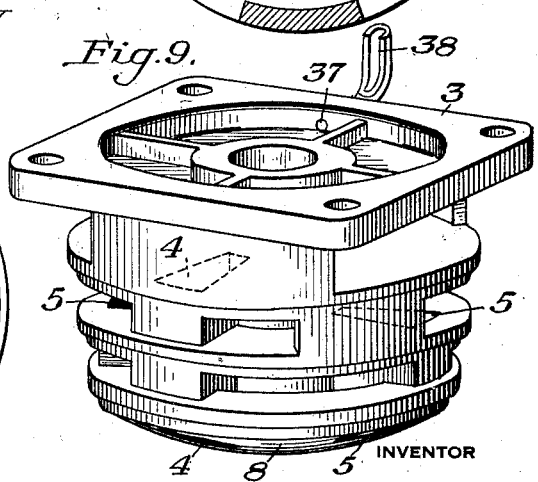

Patented Aug. 25, 1925.

1,551,209

UNITED STATES PATENT OFFICE.

FRANK W. OFELDT, OF PITTSBURGH, PENNSYLVANIA, ASSIGNOR TO O. & B. COMPANY, INCORPORATED, OF PITTSBURGH, PENNSYLVANIA, A CORPORATION OF DELAWARE.

VALVE MECHANISM.

Application filed March 11, 1924. Serial No. 698,467.

*To all whom it may concern:*

Be it known that I, FRANK W. OFELDT, a citizen of the United States, residing at Pittsburgh, county of Allegheny, State of Pennsylvania, have invented a new and useful Improvement in Valve Mechanism, of which the following is a full, clear, and exact description.

The present invention relates broadly to valve mechanism for engines, and more particularly to the construction and operation of valve mechanism of the gyratory type.

An object of the invention is to provide an improved form of positive drive for a rotary valve, enabling the valve to be yieldingly maintained at all times against its seat, and also enabling the valve stem to be loosely mounted in a manner to allow the valve to have a gyratory motion to thereby cause a shifting area of contact and grinding action between the valve and its seat tending to constantly keep the parts to a proper seating fit and properly lubricated.

A further object of the invention is to provide novel means for lubricating a valve of this type.

In the accompanying drawings, there is shown, for purposes of illustration only, one embodiment of my invention, it being understood that the drawings do not define the limits of the invention, as changes may be made in the construction and operation therein disclosed without departing from the spirit of the invention or scope of my broader claims.

In the drawings:

Figure 1 is a vertical sectional view through a portion of an engine cylinder head having therein a valve mechanism embodying my invention;

Figure 2 is an inverted plan view of the valve cage;

Figure 3 is a bottom plan view of the valve;

Figure 4 is a vertical sectional view of the valve cage taken on the line IV—IV of Figure 6;

Figure 5 is a vertical sectional view of the valve cage taken on the line V—V of Figure 6;

Figures 6, 7 and 8 are horizontal sectional views taken on the lines VI—VI, VII—VII and VIII—VIII, respectively, of Figure 4; and Figure 9 is a top plan view of the valve cage.

Referring to Figure 1, an engine cylinder head is designated by the reference character 2. Seated in the cylinder head is a valve cage 3 provided with a pair of diametrically opposite intake ports 4 and a pair of diametrically opposite exhaust ports 5. The intake ports communicate with an intake manifold 6 and the exhaust ports with an exhaust manifold 7.

The valve cage is provided at its lower end with a convex or spherical valve seat 8 engaged by a valve 9. The latter is carried by a vertically extending valve stem 10, having an enlarged head 11 at its lower end seated in a recess 12 in the valve, the said recess being closed by a screw plug 13. Rotation of the valve upon the head 11 is prevented by means of a key 14. The upper end of the valve stem is reduced and has a hub 15 mounted thereon, rotation of the stem in the hub being prevented by a key 16. The extreme upper end of the valve stem is screw threaded and is engaged by a nut 17 for holding the hub 15 on the reduced portion of the stem. The hub 15 has a diaphragm 18 secured thereto by means of rivets 19. This diaphragm is secured at its peripheral edge by means of screws 20 upon a seat 21 within the enlarged upper portion 22 of a sleeve 23. This sleeve surrounds the valve stem and rotates in a bearing 24 forming an integral portion of the valve cage.

The sleeve 23 terminates at its lower end short of the lower end of the bearing 24, and mounted upon the valve stem between the lower end of the sleeve and a shoulder 25 at the lower end of the bearing is a roller 26. The valve stem fits loosely in the sleeve and the roller fits loosely in the bearing, thereby enabling the valve 9 to have a slight bodily movement in contact with its seat, as well as a rotary movement. Interposed between the diaphragm 18 and the bottom of the enlarged portion 22 of the sleeve 23 is a coil spring 27 yieldingly maintaining the valve against its seat and counteracting any tendency of said valve to move away from its seat.

The enlarged upper portion 22 of the sleeve 23 is provided with an external ring gear 28 whereby the valve may be geared to another valve. Mounted upon the upper end of the portion 22 by means of screws 29 is a main bevel gear 30. Said gear is engaged by a bevel pinion 31, the said pinion having its shaft 32 journalled in a suitable bearing 33 in a casing 34 attached to the cylinder head. The pinion shaft 32 is adapted to be driven from the crank shaft of the engine.

Extending through the top cover 35 of the cylinder head is an oil circulating pipe 36 adapted to deliver oil upon the diaphragm 18. In operation, the oil delivered upon the diaphragm will be thrown by centrifugal force against the inner surface of the portion 22 having an oil escape opening 37 therein. Oil passing through this opening at one point in each revolution is caught by a trough 38 carried by the valve cage. This trough delivers the oil to the top of the cage from where it passes through ducts 39 to the outer surface of the sleeve 23. Obviously the oil will pass downwardly between the outer surface of the sleeve 23 and the inner surface of the bearing 24 and will finally reach and lubricate the valve seat, the combined rotary and gyratory movement of the valve effectively maintaining an oil film on the seat.

The valve cage is adapted to fit the cylinder head snugly, and gaskets 40 are provided between the cage and the head to prevent leakage. Further, a thrust washer 41 is utilized between the upper end of the bearing 24 and the bottom face of the enlarged portion 22.

The valve 9 is provided with diametrically opposite ports 42 for cooperation with intake and exhaust ports 4 and 5 of the valve cage. Due to the fact that the valve cage is provided with two diametrically opposite sets of intake and exhaust ports, the ports 42 of the valve will cooperate with these intake and exhaust ports during each 180 degrees of rotation of the valve. This enables the valve to be driven at a speed of one-fourth the speed of the engine crank shaft, when a valve mechanism of this character is employed in a 4-cycle engine. Heretofore, in 4-cycle engines employing rotary valves it has been customary to operate the valves at one-half the speed of the crank shaft of the engine. By providing a valve mechanism enabling the valve to be rotated at one-fourth the speed of the engine crank shaft, a decided advantage is gained by reason of the reduction of wear on the parts of the valve mechanism.

The valve 9 is constructed with a concave seating surface 43 for cooperation with the valve seat 8. The opposite surface 44 of the valve is formed convex and preferably the two surfaces have relative curvatures such that these surfaces intersect at the periphery of the valve. I have found that a valve construction of this character counteracts any tendency of the seating surface of the valve to deviate from a true seating surface upon expansion or contraction of the valve. This, in conjunction with the loose mounting of the valve stem enabling the valve to have a gyratory motion, insures a proper seating fit and effective lubrication between the valve and its seat at all times. I make no claim, however, in the present application to the particular construction of the valve, as this forms the subject matter of my co-pending application, Serial No. 698,466 filed of even date herewith.

From the foregoing, the advantages of the present invention will be apparent. The provision of a diaphragm drive for the valve enables the valve to be maintained yieldingly against its seat at all times during operation. While I have shown a spring for this purpose, it will be apparent that the diaphragm itself might be constructed to perform this function if desired. The provision of the diaphragm drive for the valve also enables the valve stem to be loosely mounted in such manner as to provide for a gyratory motion of the valve. The novel means provided for maintaining the bearing parts of the valve mechanism lubricated, obviates any danger of these parts burning out.

I claim:

1. A rotary valve mechanism, comprising a valve seat, a valve engaging said seat, driving means for said valve, and a diaphragm operatively connecting said valve with said driving means, substantially as described.

2. A rotary valve mechanism, comprising a valve cage provided with a valve seat, a valve engaging said seat, a valve stem supporting said valve, driving means for said valve, and a diaphragm operatively connecting said driving means with said valve stem, substantially as described.

3. A rotary valve mechanism, comprising a valve seat, a valve engaging said seat, a valve stem supporting said valve, a driving member, a diaphragm secured to said stem and member and forming an operative connection between the two, and a spring engaging said diaphragm and yieldingly maintaining said valve in engagement with its seat, substantially as described.

4. A rotary valve mechanism, comprising a valve seat, a valve engaging said seat, driving means for said valve, and means comprising a diaphragm operatively connecting said valve with said driving means and yieldingly maintaining said valve against its seat, said means permitting said valve to have a gyratory motion, substantially as described.

5. A rotary valve mechanism, comprising a valve seat, a valve engaging said seat, a valve stem carried by said valve, driving means for said valve, means comprising a diaphragm operatively connecting said stem with said driving means and yieldingly maintaining said valve against its seat, and a bearing for said stem, said stem fitting loosely in said bearing, whereby said valve is permitted to have a gyratory motion, substantially as described.

6. A rotary valve mechanism, comprising a valve seat, a valve engaging said seat, driving means for said valve, a diaphragm connecting said valve with said driving means, means for delivering a lubricant to said diaphragm, and means for collecting said lubricant thrown by centrifugal force from said diaphragm and delivering it to said valve seat, substantially as described.

7. A rotary valve mechanism, comprising a valve seat, a valve engaging said seat, a valve stem carried by said valve, a bearing surrounding said valve stem, driving means for said valve, a diaphragm connecting said valve stem with said driving means, means for delivering a lubricant to said diaphragm, and means for collecting the lubricant thrown by centrifugal force from said diaphragm and delivering it to said bearing, substantially as described.

8. A rotary valve mechanism, comprising a valve seat, a valve engaging said seat, a valve stem carried by said valve, a bearing surrounding said valve stem, driving means for said valve, a diaphragm operatively connecting said valve stem with said driving means, means for delivering a lubricant to said diaphragm, and means for delivering said lubricant from said diaphragm to said bearing, substantially as described.

In testimony whereof I have hereunto set my hand.

FRANK W. OFELDT.